(12) United States Patent
Wang et al.

(10) Patent No.: US 11,775,761 B2
(45) Date of Patent: Oct. 3, 2023

(54) METHOD AND APPARATUS FOR MINING ENTITY FOCUS IN TEXT (71) Applicant: BEIJING BAIDU NETCOM SCIENCE AND TECHNOLOGY CO., LTD., Beijing (CN)

(72) Inventors: Shu Wang, Beijing (CN); Kexin Ren, Beijing (CN); Xiaohan Zhang, Beijing (CN); Zhifan Feng, Beijing (CN); Yang Zhang, Beijing (CN); Yong Zhu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 275 days.

(21) Appl. No.: 17/023,915

(22) Filed: Sep. 17, 2020

(65) Prior Publication Data
US 2021/0216715 A1 Jul. 15, 2021

(30) Foreign Application Priority Data
Jan. 15, 2020 (CN) .......................... 202010042233.3

(51) Int. Cl.
G06F 40/295 (2020.01)
G06F 16/33 (2019.01)
(Continued)

(52) U.S. Cl.
CPC ........ G06F 40/295 (2020.01); G06F 16/3347 (2019.01); G06F 40/253 (2020.01);
(Continued)

(58) Field of Classification Search
CPC ...... G06F 40/295; G06F 40/253; G06F 16/33; G06F 16/3347; G06F 40/30; G06N 20/00; G06N 5/04
See application file for complete search history.

(56) References Cited

U.S. PATENT DOCUMENTS 8,478,420 B2 * 7/2013 Armstrong ............... A61N 1/08
607/63
2018/0129938 A1 5/2018 Xiong
(Continued)

FOREIGN PATENT DOCUMENTS

CN 105243130 A 1/2016
CN 108563636 A 4/2018
(Continued)

OTHER PUBLICATIONS

Japanese Office Action issued in Application No. 2021-003861 dated Apr. 5, 2021.
(Continued)

Primary Examiner — Richemond Dorvil
Assistant Examiner — Ethan Daniel Kim
(74) Attorney, Agent, or Firm — Knobbe, Martens, Olson & Bear LLP (57) ABSTRACT A method for mining an entity focus in a text may include: performing word and phrase feature extraction on an input text; inputting an extracted word and phrase feature into a text coding network for coding, to obtain a coding sequence of the input text; processing the coding sequence of the input text using a core entity labeling network to predict a position of a core entity in the input text; extracting a subsequence corresponding to the core entity in the input text from the coding sequence of the input text, based on the position of the core entity in the input text; and predicting a position of a focus corresponding to the core entity in the input text using a focus labeling network, based on the coding sequence of the input text and the subsequence corresponding to the core entity in the input text.

16 Claims, 5 Drawing Sheets (51) Int. Cl.
    *G06N 20/00*     (2019.01)
    *G06F 40/253*     (2020.01)
    *G06N 5/04*     (2023.01)
    *G06F 40/30*     (2020.01)

(52) U.S. Cl.
    CPC ............... *G06N 5/04* (2013.01); *G06N 20/00* (2019.01); *G06F 40/30* (2020.01); *G06F 2216/03* (2013.01)

(56) References Cited

U.S. PATENT DOCUMENTS

| | | | |
|---|---|---|---|
| 2018/0233141 A1* | 8/2018 | Solomon | G10L 15/22 |
| 2019/0114544 A1* | 4/2019 | Sundaram | G06N 3/08 |
| 2020/0104641 A1* | 4/2020 | Alvelda, VII | G06K 9/62 |

FOREIGN PATENT DOCUMENTS

| | | |
|---|---|---|
| CN | 108334490 A | 7/2018 |
| CN | 108664473 A | 10/2018 |
| CN | 109388793 A | 2/2019 |
| CN | 109408812 A | 3/2019 |
| CN | 109918510 A | 6/2019 |
| CN | 109933801 A | 6/2019 |
| CN | 110008469 A | 7/2019 |
| CN | 110046350 A | 7/2019 |
| CN | 110110330 A | 8/2019 |
| CN | 110263174 A | 9/2019 |
| CN | 110263323 A | 9/2019 |
| CN | 110377748 A | 10/2019 |
| CN | 110472242 A | 11/2019 |
| CN | 110516073 A | 11/2019 |
| CN | 110598213 A | 12/2019 |
| KR | 10-2016-0105688 A | 9/2016 |
| KR | 20190050180 A | 5/2019 |
| KR | 20190114195 A | 10/2019 |

OTHER PUBLICATIONS

Magnolini, et al., How to Use Gazetteers for Entity Recognition with Neural Models, Proceedings of the 5th Workshop on Semantic Deep Learning (SemDeep-5), pp. 40-49, Macau, China.

Korean Office Action issued in application No. KR 10-2021-0005121 dated Apr. 26, 2022.

Ben-Ami, et al. "Exploiting the focus of the document for enhanced entities' sentiment relevance detection" 2015 IEEE 15$^{th}$ International Conference on Data Mining Workshops, 2015.

Bernardi, et al. "Context Modeling for IQA: The Role of Tasks and Entities", Coling 2008: Proceedings of the workshop on knowledge and reasoning for answering questions, pp. 25-32 Manchester, Aug. 2008.

\* cited by examiner

METHOD AND APPARATUS FOR MINING ENTITY FOCUS IN TEXT

CROSS-REFERENCE TO RELATED APPLICATIONS

This application claims priority to Chinese Application No. 202010042233.3, filed on Jan. 15, 2020 and entitled "Method and Apparatus for Mining Entity Focus in Text," the entire disclosure of which is hereby incorporated by reference.

TECHNICAL FIELD

Embodiments of the present disclosure relate to the field of computer technology, specifically to the field of text data processing technology, and more specifically to a method and apparatus for mining an entity focus in a text.

BACKGROUND

With the development of Internet technology, a large number of short texts appears in network applications such as social platforms. An entity focus in a text represents the entity included in text information and focus information such as entity attributes, related topics or events described about the entity. Entity focus labeling is a technology to clarify the mainly described entity and the corresponding entity focus from text data. A labeling result of an entity focus may be used to quickly refine the text content and make interpretable information recommendations.

The conventional entity focus labeling method mainly uses keyword recognition to extract entity keywords and focus keywords. This method relies on the construction of a keyword library, cannot well cover the entities in a text, and cannot determine the relationship between the entity and the focus.

SUMMARY

Embodiments of the present disclosure propose a method and apparatus for mining an entity focus in a text, an electronic device, and a computer readable medium.

In a first aspect, an embodiment of the present disclosure provides a method for mining an entity focus in a text, the method including: performing word and phrase feature extraction on an input text; inputting an extracted word and phrase feature into a text coding network for coding, to obtain a coding sequence of the input text; processing the coding sequence of the input text using a core entity labeling network to predict a position of a core entity in the input text; extracting a subsequence corresponding to the core entity in the input text from the coding sequence of the input text, based on the position of the core entity in the input text; and predicting a position of a focus corresponding to the core entity in the input text using a focus labeling network, based on the coding sequence of the input text and the subsequence corresponding to the core entity in the input text.

In some embodiments, the performing word and phrase feature extraction on an input text, includes: performing word and phrase hybrid embedding on a word sequence corresponding to the input text to obtain a corresponding word feature vector; performing position embedding on characters in the word sequence corresponding to the input text to obtain a corresponding position feature vector; performing named entity recognition on the input text, and generating a named entity type feature vector representing a type of a named entity based on a result of the named entity recognition; and splicing the word feature vector, the position feature vector and the named entity type feature vector corresponding to the input text to form a word and phrase feature vector of the input text.

In some embodiments, the generating a named entity type feature vector representing a type of a named entity based on a result of the named entity recognition, includes: performing part of speech labeling on a target phrase, in response to not recognizing a type of a named entity of the target phrase in the input text, and generating the named entity type feature vector based on the type of the named entity recognized from the input text and a part of speech labeling result of the target phrase.

In some embodiments, the processing the coding sequence of the input text using a core entity labeling network to predict a position of a core entity in the input text, includes: inputting the coding sequence of the input text into the core entity labeling network to predict a probability of each word string in the input text being the core entity, and labeling a starting position and an ending position of the core entity respectively using a double pointer based on the probability of each word string in the input text being the core entity.

In some embodiments, the predicting a position of a focus corresponding to the core entity in the input text using a focus labeling network, based on the coding sequence of the input text and the subsequence corresponding to the core entity in the input text, includes: acquiring a priori feature of the focus of the core entity constructed based on a focus repository of the core entity; and generating a first focus feature of the input text, based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

In some embodiments, the inputting the first focus feature of the input text into the focus labeling network, to predict the position of the focus corresponding to the core entity predicted by the core entity labeling network, includes: inputting the first focus feature of the input text into the focus labeling network to predict a probability of each word string in the input text being the focus of the core entity, and labeling a starting position and an ending position of the focus of the core entity respectively using a double pointer based on the probability of each word string in the input text being the focus of the core entity.

In some embodiments, the input text includes: labeling information of the core entity and the corresponding focus; the method further includes: determining prediction errors of positions of the core entity and the corresponding focus in the input text, based on the labeling information of the core entity and the corresponding focus in the input text, and iteratively adjusting parameters in a model for labeling the focus of the core entity using a backpropagation method to obtain a trained model for labeling the focus of the core entity, the model for labeling the focus of the core entity including the text coding network, the core entity labeling network, and the focus labeling network.

In some embodiments, the method further includes: extracting a relative position feature of the core entity and the corresponding focus based on the labeling information of the core entity and the corresponding focus in the input text and coding the relative position feature to obtain a relative position feature sequence; and the predicting a position of a focus corresponding to the core entity in the input text using a focus labeling network, based on the coding sequence of the input text and the subsequence corresponding to the core entity in the input text, includes: acquiring a priori feature of the focus of the core entity constructed based on a focus repository of the core entity; splicing a result of coding the subsequence corresponding to the core entity in the input text with the relative position feature sequence to obtain a coding sequence of the core entity in the input text; and generating a second focus feature of the input text, based on the coding sequence of the input text, the priori feature of the focus of the core entity, and the coding sequence corresponding to the core entity in the input text, and inputting the second focus feature of the input text into the focus labeling network, to predict the position of the focus corresponding to the core entity predicted by the core entity labeling network.

In a second aspect, an embodiment of the present disclosure provides an apparatus for mining an entity focus in a text, the apparatus including: a first extraction unit, configured to perform word and phrase feature extraction on an input text; a coding unit, configured to input an extracted word and phrase feature into a text coding network for coding, to obtain a coding sequence of the input text; a first labeling unit, configured to process the coding sequence of the input text using a core entity labeling network to predict a position of a core entity in the input text; a second extraction unit, configured to extract a subsequence corresponding to the core entity in the input text from the coding sequence of the input text, based on the position of the core entity in the input text; and a second labeling unit, configured to predict a position of a focus corresponding to the core entity in the input text using a focus labeling network, based on the coding sequence of the input text and the subsequence corresponding to the core entity in the input text.

In some embodiments, the first extraction unit is configured to perform word and phrase feature extraction on an input text as follows: performing word and phrase hybrid embedding on a word sequence corresponding to the input text to obtain a corresponding word feature vector; performing position embedding on characters in the word sequence corresponding to the input text to obtain a corresponding position feature vector; performing named entity recognition on the input text, and generating a named entity type feature vector representing a type of a named entity based on a result of the named entity recognition; and splicing the word feature vector, the position feature vector and the named entity type feature vector corresponding to the input text to form a word and phrase feature vector of the input text.

In some embodiments, the first extraction unit is further configured to generate a named entity type feature vector representing a type of a named entity as follows: performing part of speech labeling on a target phrase, in response to not recognizing a type of a named entity of the target phrase in the input text, and generating the named entity type feature vector based on the type of the named entity recognized from the input text and a part of speech labeling result of the target phrase.

In some embodiments, the first labeling unit is configured to predict a position of a core entity in the input text as follows: inputting the coding sequence of the input text into the core entity labeling network to predict a probability of each word string in the input text being the core entity, and labeling a starting position and an ending position of the core entity respectively using a double pointer based on the probability of each word string in the input text being the core entity.

In some embodiments, the second labeling unit is configured to predict a position of a focus corresponding to the core entity in the input text as follows: acquiring a priori feature of the focus of the core entity constructed based on a focus repository of the core entity; and generating a first focus feature of the input text, based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

In some embodiments, the second labeling unit is further configured to predict the position of the focus corresponding to the core entity predicted by the core entity labeling network as follows: inputting the first focus feature of the input text into the focus labeling network to predict a probability of each word string in the input text being the focus of the core entity, and labeling a starting position and an ending position of the focus of the core entity respectively using a double pointer based on the probability of each word string in the input text being the focus of the core entity.

In some embodiments, the input text includes: labeling information of the core entity and the corresponding focus; the apparatus further includes: an iterative adjustment unit, configured to determine prediction errors of positions of the core entity and the corresponding focus in the input text, based on the labeling information of the core entity and the corresponding focus in the input text, and iteratively adjust parameters in a model for labeling the focus of the core entity using a backpropagation method to obtain a trained model for labeling the focus of the core entity, the model for labeling the focus of the core entity including the text coding network, the core entity labeling network, and the focus labeling network.

In some embodiments, the apparatus further includes: a third extraction unit, configured to extract a relative position feature of the core entity and the corresponding focus based on the labeling information of the core entity and the corresponding focus in the input text and code the relative position feature to obtain a relative position feature sequence; and the second labeling unit is further configured to predict a position of a focus corresponding to the core entity in the input text as follows: acquiring a priori feature of the focus of the core entity constructed based on a focus repository of the core entity; splicing a result of coding the subsequence corresponding to the core entity in the input text with the relative position feature sequence to obtain a coding sequence of the core entity in the input text; and generating a second focus feature of the input text, based on the coding sequence of the input text, the priori feature of the focus of the core entity, and the coding sequence corresponding to the core entity in the input text, and inputting the second focus feature of the input text into the focus labeling network, to predict the position of the focus corresponding to the core entity predicted by the core entity labeling network.

In a third aspect, an embodiment of the present disclosure provides an electronic device, the device electronic including: one or more processors; and a storage apparatus, for storing one or more programs, where the one or more programs, when executed by the one or more processors, cause the one or more processors to implement the method for mining an entity focus in a text according to the first aspect.

In a fourth aspect, an embodiment of the present disclosure provides a computer readable medium, storing a computer program thereon, where the program, when executed by a processor, implements the method for mining an entity focus according to the first aspect.

According to the method and apparatus for mining an entity focus in a text in embodiments of the present disclosure, by performing word and phrase feature extraction on an input text; inputting an extracted word and phrase feature into a text coding network for coding, to obtain a coding sequence of the input text; processing the coding sequence of the input text using a core entity labeling network to predict a position of a core entity in the input text; extracting a subsequence corresponding to the core entity in the input text from the coding sequence of the input text, based on the position of the core entity in the input text; and predicting a position of a focus corresponding to the core entity in the input text using a focus labeling network, based on the coding sequence of the input text and the subsequence corresponding to the core entity in the input text, a precise and comprehensive extraction of the entity focus in a text is realized.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
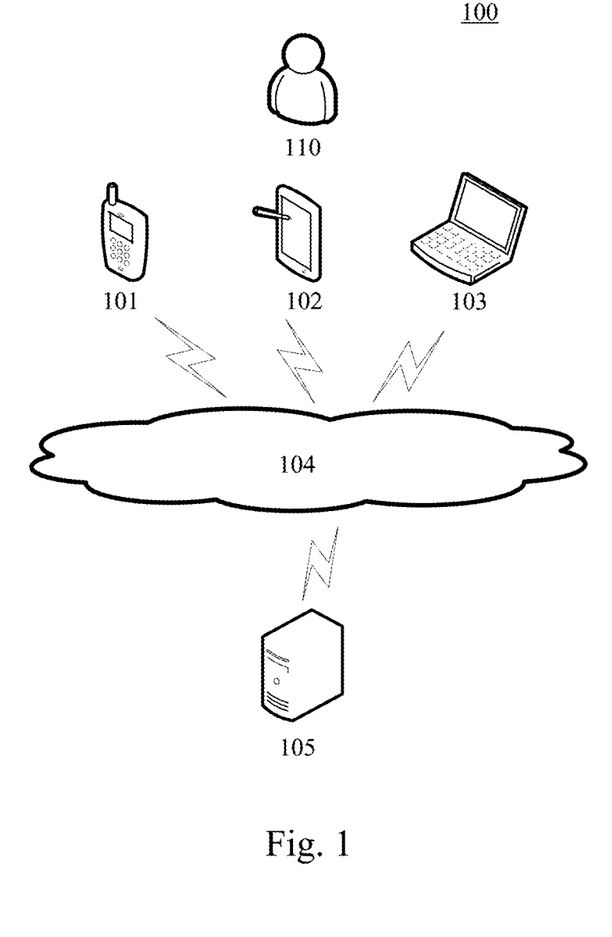
FIG. 1 is a diagram of an example system architecture in which embodiments of the present disclosure may be implemented.

FIG. 1 illustrates an example system architecture 100 in which a method for mining an entity focus in a text or an apparatus for mining an entity focus in a text according to the present disclosure may be implemented.

As shown in FIG. 1, the system architecture 100 may include terminal devices 101, 102, 103, a network 104 and a server 105. The network 104 serves as a medium providing a communication link between the terminal devices 101, 102, 103 and the server 105. The network 104 may include various types of connections, such as wired or wireless communication links, or optic fibers.

The terminal devices 101, 102, and 103 interact with the server 105 through the network 104 to receive or send messages or the like. The terminal devices 101, 102, 103 may be client devices, on which various client applications may be installed, for example, social platform applications, news information applications, e-commerce applications, or the like.

The terminal devices 101, 102, and 103 may be hardware or software. When the terminal devices 101, 102, and 103 are hardware, the terminal devices 101, 102, and 103 may be various electronic devices, including but not limited to smart phones, tablet computers, e-book readers, laptop portable computers, desktop computers or the like. When the terminal devices 101, 102, and 103 are software, the terminal devices 101, 102, and 103 may be installed in the electronic devices listed above. The terminal devices 101, 102, and 103 may be implemented as a plurality of software programs or software modules (for example, a plurality of software programs or software modules for providing distributed services), or as a single software program or software module. The present disclosure is not specifically limited herein.

The server 105 may be a server running various services, such as a backend server of a social platform application. The backend server of the social platform application may acquire social platform data generated in the social platform application on the terminal devices 101, 102, 103, including content data published by users, operation data on the published content by users, and so on. For example, the backend server of the social platform application may perform data mining on the acquired data, and extract key information from the data.

The server 105 may also be, for example, a server that provides network data mining processing services, for example, a search engine server. The server 105 may acquire the webpage content of each source website in the network, perform data mining on the webpage content, and extract key information.

In an application scenario of the present disclosure, the server 105 may perform entity focus mining on text data acquired from the terminal devices 101, 102, 103 or acquired from the source website of a page.

It should be noted that the method for mining an entity focus in a text provided by embodiments of the present disclosure is generally performed by the server 105. Accordingly, the apparatus for mining an entity focus in a text is generally provided in the server 105.

In some scenarios, the server 105 may acquire to-be-processed text data from a database, a memory, or other servers (such as a website server). In this regard, the example system architecture 100 may not include the terminal devices 101, 102, 103.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of software programs or software modules (for example, a plurality of software programs or software modules for providing distributed services), or as a single software program or software module. The present disclosure is not specifically limited herein.

It should be understood that the numbers of terminal devices, networks and servers in FIG. 1 are merely illustrative. Depending on the implementation needs, there may be any number of terminal devices, networks and servers.

Figure 2:
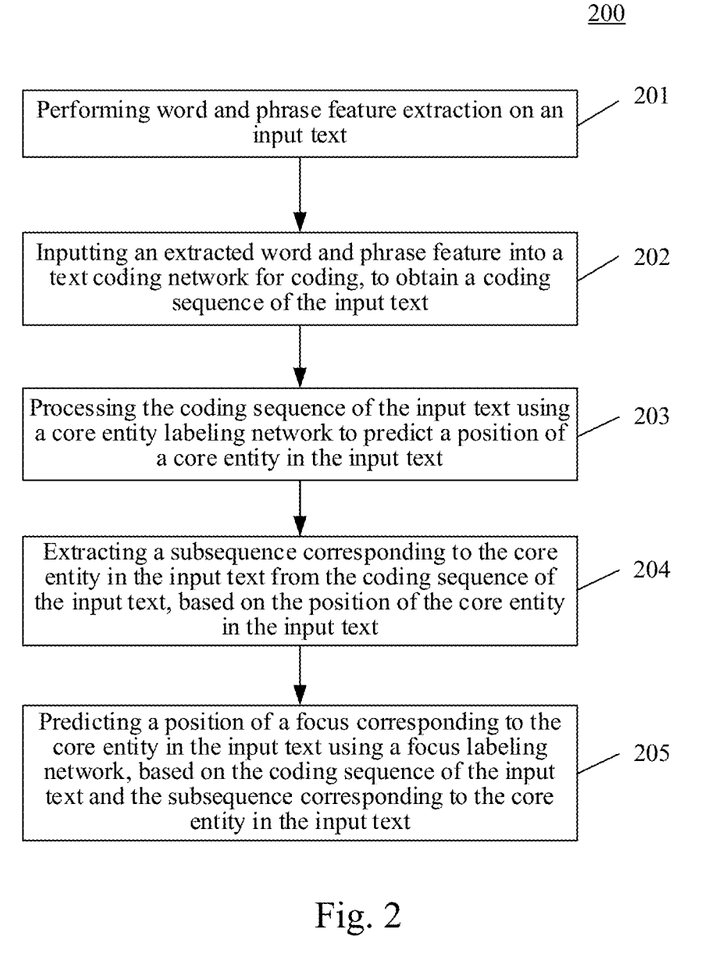
FIG. 2 is a flowchart of a method for mining an entity focus in a text according to an embodiment of the present disclosure.

With further reference to FIG. 2, a flow 200 of a method for mining an entity focus in a text according to an embodiment of the present disclosure is illustrated. The method for mining an entity focus in a text includes the following steps.

Step 201, performing word and phrase feature extraction on an input text.

The entity focus in the text is the entity mainly described in the text and the entity's attributes, associated entities, related topics or events, and other aspects of information. In the present embodiment, an executing body of the method for mining an entity focus in a text may acquire a to-be-mined text as the input text. The input text may be text content posted by a user in a social platform, or may be text content in a web page. Alternatively, the input text in embodiments of the present disclosure may be short texts such as instant messages, or messages on forums or social platforms.

In the present embodiment, the input text may be split into a word sequence, and then feature extraction and mathematical characterization of features may be performed on the word sequence of the input text, to convert the input text into a corresponding vector sequence. Specifically, phrase embedding may be performed on the word sequence of the input text to obtain the vector sequence corresponding to the input text. Alternatively, methods such as topic model, or TF-IDF (term frequency-inverse document frequency) may be used to extract features of the input text.

Alternatively, word and phrase feature extraction may be performed on the input text as follows.

First, word and phrase hybrid embedding is performed on a word sequence corresponding to the input text to obtain a corresponding word feature vector. In entity focus labeling, it is necessary to accurately perform boundary segmentation of entities and focuses on the text. In order to avoid errors in boundary segmentation as much as possible, feature extraction and coding are performed in units of words. At the same time, it is difficult for a single word to store effective semantic information, therefore, it is necessary to combine the phrase embedding method to extract the features of the input text.

Specifically, word embedding processing may be first performed on the word sequence of the input text in units of words to obtain a word vector sequence, and then word segmentation is performed on the input text. A Word2Vec model is used to extract corresponding phrase vectors, and then the phrase vector of each phrase is repeated N times, where N is the number of words contained in a phrase, the phrase vector is matrix transformed to the same dimension as the word vector, and N phrase vectors are mixed with corresponding N word vectors respectively.

For example, after word segmentation is performed on the input text, one of the phrases is "Yangtze River Great Bridge", and word embedding is performed to respectively obtain the word embedding vectors of the four words "Yangtze", "River", "Great", and "Bridge", and phrase embedding is performed to obtain the phrase embedding vector of the "Yangtze River Great Bridge". The phrase embedding vector of the "Yangtze River Great Bridge" may be repeated four times, and the word embedding vectors of the four words "Yangtze", "River", "Great", and "Bridge" may be used to mix with the phrase embedding vector of the "Yangtze River Great Bridge" respectively to generate the word vector sequence corresponding to the phrase "Yangtze River Great Bridge".

Then, position embedding is performed on characters in the word sequence corresponding to the input text to obtain a corresponding position feature vector. Position embedding indicates the position of each phrase in the input text. For example, a short text contains 10 words, the phrase X appears in the $3^{rd}$, $4^{th}$, and $5^{th}$ words, then a corresponding position embedding result may be expressed as a 10-dimensional vector, where the vector value of the $3^{rd}$, $4^{th}$, and $5^{th}$ dimension is 1, and the vector value of other dimensions is 0.

Then, named entity recognition is performed on the input text, and a named entity type feature vector representing a type of a named entity is generated based on a result of the named entity recognition.

Based on a named entity library, the NER (Named Entity Recognition) model may be used to identify the type of the named entity in the input text. Then, the type of the named entity is converted to the corresponding feature vector.

Named entity recognition may classify and label some verbs or nouns in the text that represent persons, organizations, positions, time, quantity, and the like. In some scenarios, there may be phrases in the text that cannot be labeled by the type of the named entity, such as "playing basketball." In some alternative implementations of the present embodiment, part of speech labeling may be performed on the target phrase, in response to not recognizing a type of a named entity of a target phrase in the input text. If there is a target phrase in the input text that cannot be recognized for entity type by the NER model, part of speech labeling may be performed on the target phrase, for example, the target phrase is labeled as "verb", "noun", "gerund", etc. In this regard, the named entity type feature vector may be generated based on the type of the named entity recognized from the input text and a part-of-speech labeling result of the target phrase. The semantic feature of each phrase may be extracted through named entity recognition and part-of-speech labeling.

Finally, the word feature vector, the position feature vector and the named entity type feature vector corresponding to the input text are spliced to form a word and phrase feature vector of the input text.

The word feature vector, the position feature vector and the named entity type feature vector corresponding to the above input text may be spliced. Specifically, the word feature vector, the position feature vector and the named entity type feature vector corresponding to the above input text may be converted to the same dimension and then spliced to form the word and phrase feature vector of the input text.

It should be noted that, similar to the above word and phrase hybrid embedding method, in the present embodiment, the feature vector extracted through named entity recognition and part-of-speech labeling may also be repeated N times (where N is the number of words included in the corresponding phrase), aligned with the word vectors of the N words in the phrase, and then mixed with the word vectors of the words in the corresponding phrase respectively, so that the word feature vector and the named entity type feature vector corresponding to the input text are mixed and spliced.

Since the word and phrase feature vector of the input text contains the position feature vector representing the position of each word and the named entity type feature vector, the word and phrase feature vector of the input text contains rich semantic feature information. In this way, it may help to accurately analyze the semantic relevance between phrases in the subsequent labeling of the entity focus, thus accurately labeling the position of the entity focus.

Step 202, inputting an extracted word and phrase feature into a text coding network for coding, to obtain a coding sequence of the input text.

The text coding network may be a neural network model constructed based on a convolutional neural network, a cyclic neural network, etc., for converting features of a text into codes. In the present embodiment, a dilated gate convolutional neural network may be used as the text coding network. The dilated gate convolutional neural network may increase the receptive field of each neuron, so that each layer of neurons may capture the output of a larger range of neurons in the previous layer, and the output of each neuron contains a larger range of information, so that a dependency relationship between the distant sequence elements in longer sequence information may be effectively extracted. By applying the dilated gate convolutional neural network as the text coding network, it is possible to accurately extract the dependency relationship between the distant words or phrases in the input text.

In practical applications, the above text coding network may be a neural network pre-trained based on samples. When the method of the present embodiment is applied to training an entity focus labeling model including a text coding network, the above text coding network may be a neural network to be trained to optimize network parameters.

Step 203, processing the coding sequence of the input text using a core entity labeling network to predict a position of a core entity in the input text.

The core entity labeling network is used to label the position of the core entity in the input text. The coding sequence obtained by coding the word and phrase features of the input text in step 202 may be inputted into the core entity labeling network to label the position of the core entity. The position of the core entity may include the starting position of the core entity, or may include the starting position and the ending position of the core entity, or may include the positions of all words covered by the core entity.

In practical applications, the core entity labeling network may be a pre-trained neural network. When the method of the present embodiment is applied to training an entity focus labeling model including the core entity labeling network, the core entity labeling network may be a neural network to be trained to optimize network parameters.

The core entity in the input text is the main entity that represents the subject described by the input text. For example, a piece of news text describing the opening of the Zhuhai-Hong Kong-Macao Bridge may include entities such as "Zhuhai-Hong Kong-Macao Bridge", "Bridge", and "Guangdong", of which the "Zhuhai-Hong Kong-Macao Bridge" is the core entity.

In some alternative implementations of the present embodiment, in step 203, the position of the core entity in the input text may be predicted as follows: inputting the coding sequence of the input text into the core entity labeling network to predict a probability of each word string in the input text being the core entity, and labeling a starting position and an ending position of the core entity respectively using a double pointer based on the probability of each word string in the input text being the core entity.

Here, the double pointer includes a pointer for labeling the starting position and a pointer for labeling the ending position. Specifically, the core entity labeling network may be used to predict the probability of each word in the input text as the starting position of the core entity and the probability of each word in the input text as the ending position of the core entity. Then, based on the probability of each word as the starting position of the core entity and the probability of each word as the ending position of the core entity, the word string as the core entity is determined. A binary classification model may be used to determine whether each word is the starting position of the core entity, and another binary classification model may be used to determine whether each word is the ending position of the core entity.

Using the double pointer to label the starting and ending positions of the core entity may effectively label an embedded entity. For example, for a word string "school district house, Haidian district, Beijing" in the input text, the core entity labeling network may label three entities "Beijing", "Haidian district, Beijing", and "school district house, Haidian district, Beijing", thus the omission of important entities when labeling may be avoided and prediction results for long entities may be more accurate.

Alternatively, the core entity labeling network may include an attention layer, and the attention layer may be a self attention layer. The attention layer may add attention information to the coding sequence of the input text, and specifically may add attention score information between the words or the phrases. The core entity labeling network may further include a Dense network or a convolutional neural network formed by at least one fully connected layer. The output result of the attention layer is introduced into the Dense network or the convolutional neural network to predict the position of the core entity.

Step 204, extracting a subsequence corresponding to the core entity in the input text from the coding sequence of the input text, based on the position of the core entity in the input text.

Codes corresponding to the words in the core entity may be extracted from the code sequence of the input text obtained in step 202 based on the position of the core entity labeled by the core entity labeling network, as the subsequence corresponding to the core entity.

Step 205, predicting a position of a focus corresponding to the core entity in the input text using a focus labeling network, based on the coding sequence of the input text and the subsequence corresponding to the core entity in the input text.

In the present embodiment, the subsequence corresponding to the core entity carries coding information of the core entity, and the coding sequence of the input text and the subsequence corresponding to the core entity predicted from the input text may be inputted into the focus labeling network. The focus labeling network may calculate the probability of each word string in the input text being the focus of the core entity, and perform binary classification based on the probability to obtain a prediction result of whether each word string is the focus corresponding to the core entity, thereby labeling the position of the focus corresponding to the core entity.

Alternatively, the focus labeling network may also use the double pointer method to label the predicted starting position and the ending position of the focus of the core entity.

The focus labeling network may be a pre-trained neural network for labeling the position of the focus. During training, the text labeled with the core entity and the corresponding focus may be used as a sample, and the focus labeling network learns the relationship between the core entity and the focus of the core entity during the training.

In this way, the focus labeling network may label the position of the focus of the core entity in the input text, thereby realizing core entity focus mining of the input text.

According to the above method for mining a core entity focus in a text, by performing word and phrase feature extraction on an input text, then inputting an extracted word and phrase feature into a text coding network for coding, to obtain a coding sequence of the input text, processing the coding sequence of the input text using a core entity labeling network to predict a position of a core entity in the input text, next extracting a subsequence corresponding to the core entity in the input text from the coding sequence of the input text based on the position of the core entity in the input text, and finally predicting a position of a focus corresponding to the core entity in the input text using a focus labeling network based on the coding sequence of the input text and the subsequence corresponding to the core entity in the input text, a precise and quick extraction of the entity focus in the text is realized. Moreover, this method does not rely on the construction of an entity keyword library, can effectively cover the entities in the text, and effectively extract the relationship between the entities and the focus, thereby realizing a precise extraction of the text content.

In some embodiments, before step 205, the method further includes: inputting the coding sequence of the input text into an attention network to add attention information to obtain an attention coding sequence of the input text. Here, the attention network may be a self attention network. The attention network may add attention features that represent the relationship between words or phrases in the input text to the coding sequence of the input text to obtain the attention coding sequence of the input text.

In some embodiments, the above step 205 may be implemented as follows.

First, acquiring a priori feature of the focus of the core entity constructed based on a focus repository of the core entity, where the priori feature of the focus of the core entity may be obtained by filtering the related knowledge of the core entity in the input text from the focus repository of the core entity and performing feature extraction. Alternatively, the priori feature of the focus of the core entity in the input text may be predicted by the core entity labeling network.

Then, generating a first focus feature of the input text based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

Specifically, the priori feature of the focus of the core entity may be coded, and a core entity coding network may be used to code the subsequence corresponding to the core entity in the input text to obtain a coding sequence of the core entity in the input text. Alternatively, the coding sequence of the input text may also be inputted into the attention network to add the attention information to obtain the attention coding sequence of the input text. Then, a sequence formed by splicing the coding sequence of the input text or the attention coding sequence of the input text, the coding sequence obtained by coding the priori feature of the focus of the core entity, and the coding sequence corresponding to the core entity in the input text, may be used as a first focus feature of the input text, or a weighted sum of the coding sequence of the input text or the attention coding sequence of the input text, the coding sequence obtained by coding the priori feature of the focus of the core entity, and the coding sequence corresponding to the core entity in the input text may be used as the first focus feature of the input text, and the first focus feature of the input text is inputted into the focus labeling network, to predict the position of the focus corresponding to the core entity predicted by the core entity labeling network.

The priori feature of the focus of the core entity may represent the features of some entity focuses based on the repository and large-scale data mining. For example, some entities and some focuses are based on certain dependencies, then the confidence that these focuses are used as the focuses of these entities is high. For example, for "Trailer of Movie Mulan", if the core entity "Movie Mulan" is predicted from the input text, and "Trailer" appears in the input text, then based on priori features, it may be judged that the "Trailer" has a high probability of being the corresponding focus of the "movie Mulan".

The above priori feature of the focus of the core entity may specifically include an appearance probability of each focus of the core entity mined through repository.

The core entity coding network may be a neural network for recoding the subsequence corresponding to the core entity. In actual application scenarios, the core entity coding network may be a pre-trained network. When applied to a scenario where a core entity focus labeling model including the core entity coding network is trained, the core entity coding network may be a neural network containing parameters to be optimized through training. Alternatively, the core entity coding network may be a bidirectional LSTM (Long Short-Term Memory network).

The coding sequence corresponding to the core entity obtained after the core entity coding network codes the subsequence corresponding to the core entity is spliced with the attention coding sequence of the input text to generate a first splicing sequence. The focus labeling network may predict the position of the focus corresponding to the core entity based on the first splicing sequence.

Alternatively, the first focus feature may be inputted into the focus labeling network, to predict the probability of each word string in the input text being the focus of the core entity, and a starting position and an ending position of the core entity are labeled respectively using a double pointer based on the probability of each word string in the input text being the focus of the core entity.

The focus labeling network may include two binary classification models, and the two binary classification models respectively classify whether each word in the input text is the starting position of the focus of the core entity and whether each word in the input text is the ending position of the focus of the core entity.

The focus labeling network may further include a neural network formed by at least one fully connected layer, such as a Dense network, or a convolutional neural network.

In the present embodiment, by adding priori knowledge of the focus of the core entity to the input of the focus labeling network, the accuracy of a labeling result of the focus of the core entity may be further improved. Moreover, when a piece of text contains a plurality of focuses of the core entity, the plurality of focuses may be labeled at the same time, which covers more entity focuses without relying on the keyword library, and realizes a comprehensive refinement of the text content.

In some embodiments, the method for mining an entity focus in a text may be applied to training a model for labeling the focus of the core entity. In this regard, the core entity prediction and the corresponding focus prediction operations in the above method for mining an entity focus in a text may be performed through a plurality of iterations to train the model for labeling the focus of the core entity including a core entity prediction network and a focus prediction network.

Figure 3:
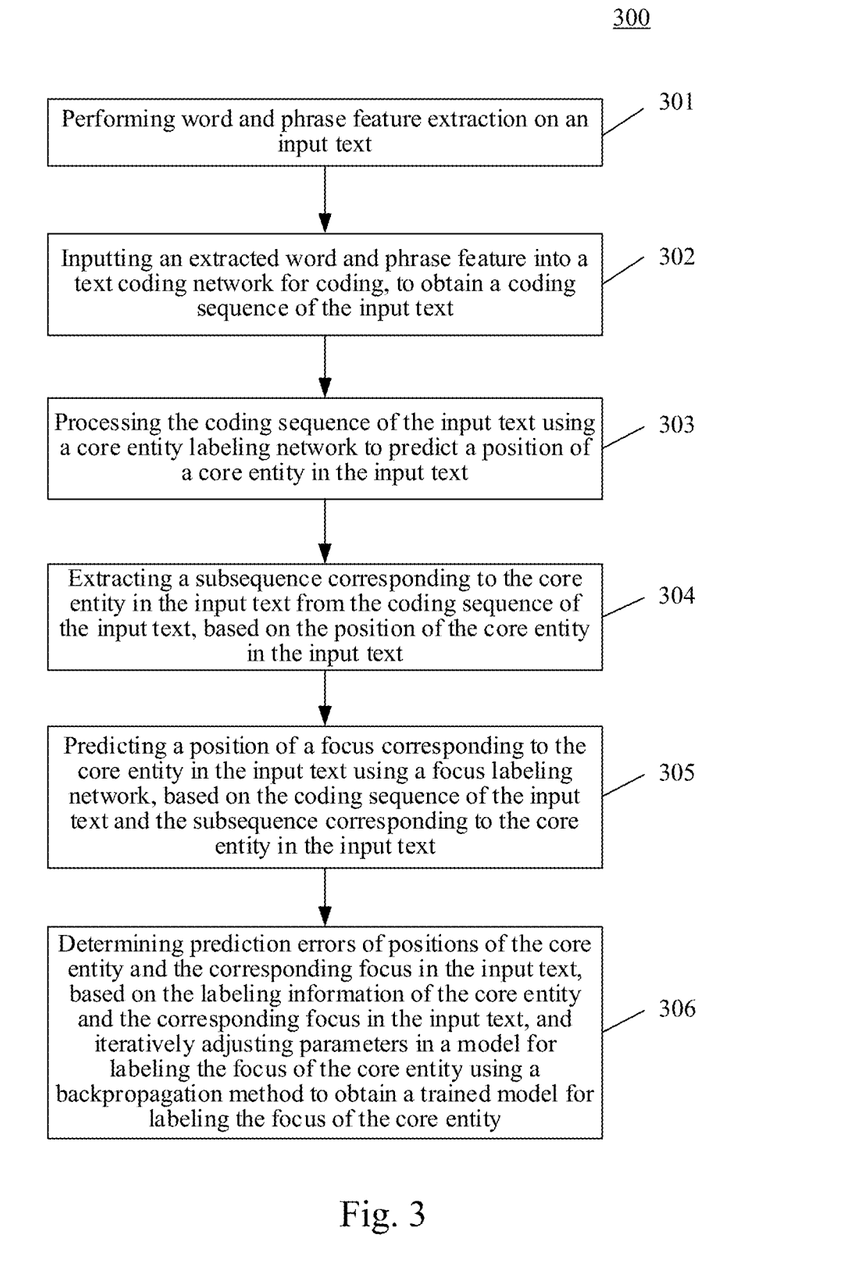
FIG. 3 is a flowchart of the method for mining an entity focus in a text according to another embodiment of the present disclosure.

With further reference to FIG. 3, a flowchart of the method for mining an entity focus in a text according to another embodiment of the present disclosure is illustrated. As shown in FIG. 3, the flow 300 of the method for mining an entity focus in a text of the present embodiment includes the following steps.

Step 301, performing word and phrase feature extraction on an input text.

In the present embodiment, an executing body of the method for mining an entity focus in a text may acquire the input text. Here, the input text may be used as a training sample of a model for labeling the focus of the core entity, including labeling information of the core entity and the corresponding focus.

The input text including the core entity and the corresponding focus labeling information may be acquired by manually labeling the core entity and the corresponding focus in the text, as the training sample of the model for labeling the focus of the core entity.

In the present embodiment, the model for labeling the focus of the core entity may include the above text coding network, the core entity labeling network, and the focus labeling network. Alternatively, the model for labeling the focus of the core entity may further include the attention network and the core entity coding network.

The method for extracting word and phrase features of the input text in the present embodiment is the same as the method in step 201 in the foregoing embodiment, and the input text may be converted into vectors by using a method such as phrase embedding. Alternatively, the method of word and phrase hybrid embedding, position embedding, and named entity type embedding described in step 201 may also be used to extract the word and phrase hybrid feature, position feature, and named entity type feature of the input text.

Step 302, inputting an extracted word and phrase feature into a text coding network for coding, to obtain a coding sequence of the input text.

Step 303, processing the coding sequence of the input text using a core entity labeling network to predict a position of a core entity in the input text.

Step 304, extracting a subsequence corresponding to the core entity in the input text from the coding sequence of the input text, based on the position of the core entity in the input text.

Step 305, predicting a position of a focus corresponding to the core entity in the input text using a focus labeling network, based on the coding sequence of the input text and the subsequence corresponding to the core entity in the input text.

Step 302 to step 305 in the present embodiment are consistent with step 202 to step 205 in the foregoing embodiment. For the specific implementations of step 302 to step 305, reference may be made to the descriptions of step 202 to step 205 in the foregoing embodiment, respectively, and detailed description thereof will be omitted.

Step 306, determining prediction errors of positions of the core entity and the corresponding focus in the input text, based on the labeling information of the core entity and the corresponding focus in the input text, and iteratively adjusting parameters in a model for labeling the focus of the core entity using a backpropagation method to obtain a trained model for labeling the focus of the core entity.

In each iteration, a deviation between the core entity in the input text predicted by the core entity labeling network and the core entity indicated by the labeling information included in the input text, and a deviation between the focus of the core entity in the input text predicted by the focus labeling network and the corresponding focus indicated by the labeling information included in the input text may be calculated and used as the prediction errors of the current model for labeling the focus of the core entity. If it is determined that the prediction errors have not reached a preset convergence condition, the gradient descent method may be used to adjust parameters of the model for labeling the focus of the core entity, and the prediction errors may be back propagated to the prediction of the model. Step 301 to step 305 are re-executed using the model for labeling the focus of the core entity after adjusting the parameters to obtain new prediction errors. In this way, the parameters of the model are continuously optimized by repeated iterations until the prediction errors of the model reach the preset convergence condition and the iteration is stopped, the parameters of the model are fixed, and the trained model for labeling the focus of the core entity is obtained. It should be noted that the parameters of the model for labeling the focus of the core entity may include the parameters of the networks included in the model for labeling the focus of the core entity. Each time the model parameters are updated, the parameters of the networks in the model may be updated at the same time.

In some alternative implementations of the present embodiment, the above method flow 300 may further include: extracting a relative position feature of the core entity and the corresponding focus based on the labeling information of the core entity and the corresponding focus in the input text and coding the relative position feature to obtain a relative position feature sequence.

Specifically, a relative position embedding method may be used to vectorize a relative position relationship between the core entity and the corresponding focus indicated by the labeling information of the input text, and a coding network constructed based on the convolutional neural network codes the vector representing the relative position relationship to obtain the relative position feature sequence.

In this regard, the above step 305 may be performed as follows.

First, the priori feature of the focus of the core entity in the input text constructed is acquired based on the focus repository of the core entity, where the priori feature of the focus of the core entity may be obtained by filtering the related knowledge of the core entity in the input text from the focus repository of the core entity and performing feature extraction. Alternatively, the priori feature of the focus of the core entity in the input text may be predicted by the to-be-trained core entity labeling network.

Then, a result of coding the subsequence corresponding to the core entity in the input text may be spliced with the relative position feature sequence to obtain a coding sequence of the core entity in the input text.

Alternatively, the model for labeling the focus of the core entity may further include the core entity coding network. The core entity coding network may be a neural network for recoding the subsequence corresponding to the core entity. Alternatively, the core entity coding network may be a bidirectional LSTM.

Finally, a second focus feature of the input text is generated based on the coding sequence of the input text, the priori feature of the focus of the core entity, and the coding sequence corresponding to the core entity in the input text, and the second focus feature of the input text is inputted into the focus labeling network to predict the position of the focus corresponding to the core entity predicted by the core entity labeling network.

Alternatively, the model for labeling the focus of the core entity may further include the attention network. The attention network is used to add attention information to the coding sequence of the input text, and the attention information represents a potential dependency relationship between the words or phrases in the input text. In this regard, the coding sequence of the input text may also be inputted into the attention network to add the attention information to obtain an attention coding sequence of the input text. The coding sequence of the input text or the attention coding sequence of the input text, the coding sequence obtained by coding the priori feature of the focus of the core entity, and the coding sequence corresponding to the core entity in the input text formed by the splicing of the result of coding the subsequence corresponding to the core entity in the input text with the relative position feature sequence may be spliced, and the obtained sequence is used as the second focus feature of the input text, or a weighted sum of the coding sequence of the input text or the attention coding sequence of the input text, the coding sequence obtained by coding the priori feature of the focus of the core entity, and the coding sequence corresponding to the core entity formed by the splicing of the result of coding the subsequence corresponding to the core entity in the input text with the relative position feature sequence is used as the second focus feature of the input text.

In practice, the coding sequence of the core entity predicted from the input text may be spliced with the relative position feature sequence to obtain a vector sequence of the same length as the coding sequence of the input text, and then spliced with the attention coding sequence of the input text, the coding sequence obtained by coding the priori feature of the focus of the core entity to form a second splicing sequence. The second splicing sequence obtained in this way not only includes the features of the input text and the position feature of the core entity, but also includes the relative position feature of the core entity and the corresponding focus and the priori feature of the focus of the core entity, thereby obtaining a more accurate focus prediction result after the focus labeling network processes the second splicing sequence.

In the above implementations, the expression of a loss function may be constructed based on the networks included in the model for labeling the focus of the core entity, and the loss function represents the prediction error of the model for labeling the focus of the core entity. By iteratively adjusting the parameters of the networks in the model for labeling the focus of the core entity to converge the value of the loss function, the parameters of the networks during training are thus gradually optimized.

Figure 4:
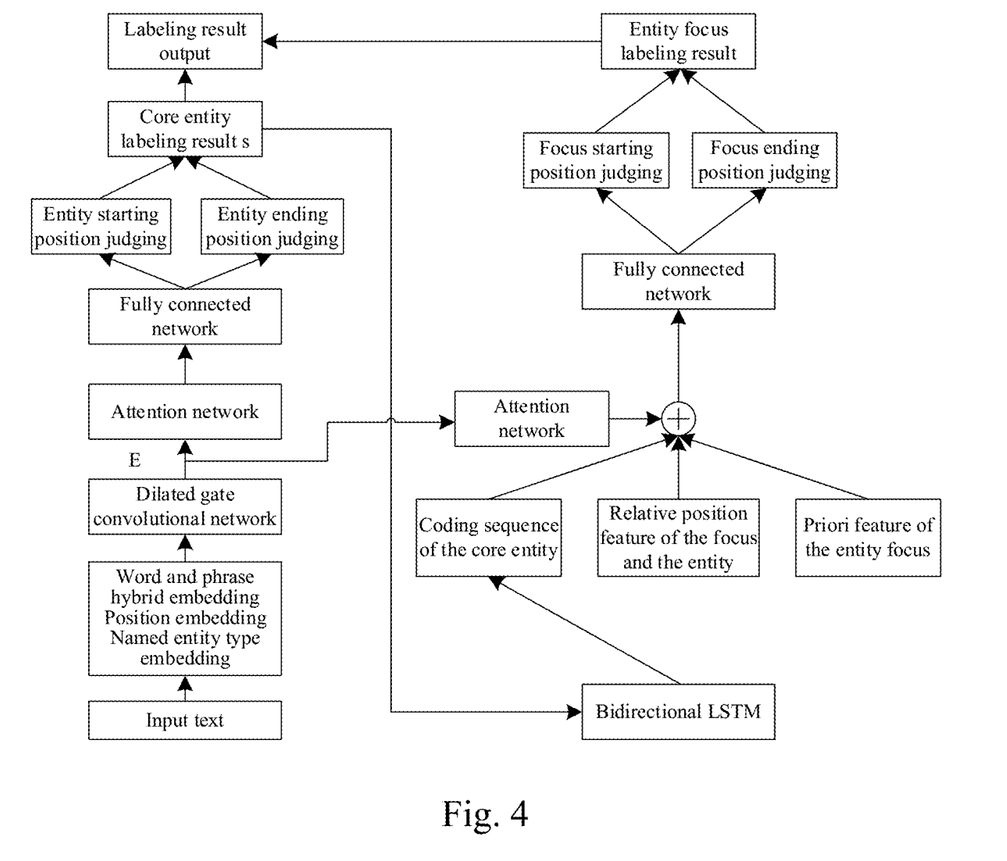
FIG. 4 is a schematic flowchart of an implementation principle of an example of the method for mining an entity focus in a text shown in FIG. 3.

With further reference to FIG. 4, a schematic flowchart of an implementation principle of an example of the method for mining an entity focus in a text shown in FIG. 3 is illustrated, and specifically the input text processing flow of the model for labeling the focus of the core entity is illustrated.

As shown in FIG. 4, first, word and phrase hybrid embedding, position embedding, and named entity type embedding are performed on the input text, and then a base dilated gate convolutional neural network is used to code obtained feature after embedding to obtain a coded sequence E. Then, the sequence E is transferred to an attention network and then an output result is transferred to a fully connected network (Dense Net), and the starting position and ending position of the core entity s are labelled using a double pointer labeling method. The subsequence of the sequence E corresponding to the core entity s is transferred to a bidirectional LSTM to obtain the coding sequence of the core entity s, and then the coding sequence of the core entity s is added to the relative position feature of the focus relative to the entity to obtain a vector sequence of the same length as the coding sequence E of the input text; then the sequence E is transferred to another attention network, and the output of the attention network is spliced with the vector sequence of the same length as the sequence E obtained in the previous step, and the priori feature coding of the entity focus constructed through the entity focus repository; a splicing result is inputted into a fully connected network (Dense Net), and the double pointer labeling method is used to label the starting position and the ending position of the focus, and finally the labeling result of the focus of the core entity is outputted.

The method for mining an entity focus in a text of the present embodiment can obtain a neural network model that can accurately label the focus of the core entity. In addition, in some implementations, the neural network model may learn the relative position of the core entity and the focus as the input feature, thereby improving the accuracy of the trained model for labeling the focus of the core entity, and at the same time improving the training efficiency.

Figure 5:
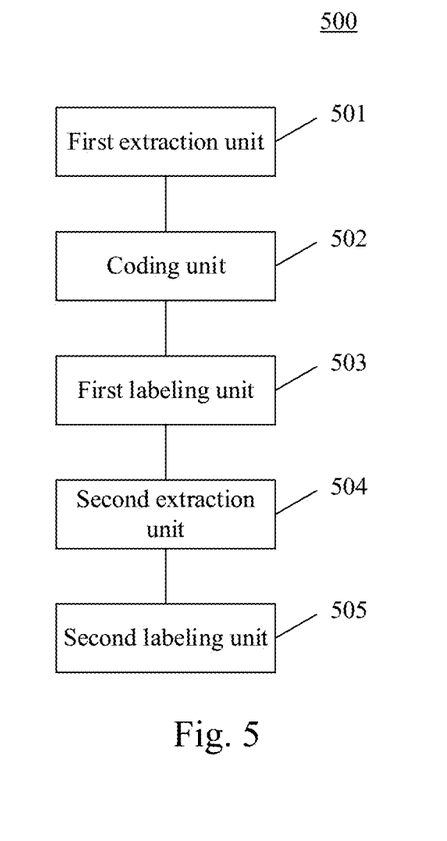
FIG. 5 is a schematic structural diagram of an apparatus for mining an entity focus in a text according to an embodiment of the present disclosure.

With further reference to FIG. 5, as an implementation of the method for mining an entity focus in a text, an embodiment of the present disclosure provides an apparatus for mining an entity focus in a text, and the apparatus embodiment may correspond to the method embodiment as shown in FIG. 2 and FIG. 3. The apparatus may be specifically applied to various electronic devices.

As shown in FIG. 5, the apparatus 500 for mining an entity focus in a text of the present embodiment includes a first extraction unit 501, a coding unit 502, a first labeling unit 503, a second extraction unit 504 and a second labeling unit 505. The first extraction unit 501 is configured to perform word and phrase feature extraction on an input text. The coding unit 502 is configured to input an extracted word and phrase feature into a text coding network for coding, to obtain a coding sequence of the input text. The first labeling unit 503 is configured to process the coding sequence of the input text using a core entity labeling network to predict a position of a core entity in the input text. The second extraction unit 504 is configured to extract a subsequence corresponding to the core entity in the input text from the coding sequence of the input text, based on the position of the core entity in the input text. The second labeling unit 505 is configured to predict a position of a focus corresponding to the core entity in the input text using a focus labeling network, based on the coding sequence of the input text and the subsequence corresponding to the core entity in the input text.

In some embodiments, the first extraction unit 501 is configured to perform word and phrase feature extraction on an input text as follows: performing word and phrase hybrid embedding on a word sequence corresponding to the input text to obtain a corresponding word feature vector; performing position embedding on characters in the word sequence corresponding to the input text to obtain a corresponding position feature vector; performing named entity recognition on the input text, and generating a named entity type feature vector representing a type of a named entity based on a result of the named entity recognition; and splicing the word feature vector, the position feature vector and the named entity type feature vector corresponding to the input text to form a word and phrase feature vector of the input text.

In some embodiments, the first extraction unit 501 is further configured to generate a named entity type feature vector representing a type of a named entity as follows: performing part of speech labeling on a target phrase, in response to not recognizing a type of a named entity of the target phrase in the input text, and generating the named entity type feature vector based on the type of the named entity recognized from the input text and a part of speech labeling result of the target phrase.

In some embodiments, the first labeling unit 503 is configured to predict a position of a core entity in the input text as follows: inputting the coding sequence of the input text into the core entity labeling network to predict a probability of each word string in the input text being the core entity, and labeling a starting position and an ending position of the core entity respectively using a double pointer based on the probability of each word string in the input text being the core entity.

In some embodiments, the second labeling unit 505 is configured to predict a position of a focus corresponding to the core entity in the input text as follows: acquiring a priori feature of the focus of the core entity constructed based on a focus repository of the core entity; and generating a first focus feature of the input text, based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

In some embodiments, the second labeling unit 505 is further configured to predict the position of the focus corresponding to the core entity predicted by the core entity labeling network as follows: inputting the first focus feature of the input text into the focus labeling network to predict a probability of each word string in the input text being the focus of the core entity, and labeling a starting position and an ending position of the focus of the core entity respectively using a double pointer based on the probability of each word string in the input text being the focus of the core entity.

In some embodiments, the input text includes: labeling information of the core entity and the corresponding focus; the apparatus 500 further includes: an iterative adjustment unit, configured to determine prediction errors of positions of the core entity and the corresponding focus in the input text, based on the labeling information of the core entity and the corresponding focus in the input text, and iteratively adjust parameters in a model for labeling the focus of the core entity using a backpropagation method to obtain a trained model for labeling the focus of the core entity, the model for labeling the focus of the core entity including the text coding network, the core entity labeling network, and the focus labeling network.

In some embodiments, the apparatus further includes: a third extraction unit, configured to extract a relative position feature of the core entity and the corresponding focus based on the labeling information of the core entity and the corresponding focus in the input text and code the relative position feature to obtain a relative position feature sequence; and the second labeling unit 505 is further configured to predict a position of a focus corresponding to the core entity in the input text as follows: acquiring a priori feature of the focus of the core entity constructed based on a focus repository of the core entity; splicing a result of coding the subsequence corresponding to the core entity in the input text with the relative position feature sequence to obtain a coding sequence of the core entity in the input text; and generating a second focus feature of the input text, based on the coding sequence of the input text, the priori feature of the focus of the core entity, and the coding sequence corresponding to the core entity in the input text, and inputting the second focus feature of the input text into the focus labeling network, to predict the position of the focus corresponding to the core entity predicted by the core entity labeling network.

The units in the apparatus 500 correspond to the steps in the method described with reference to FIG. 2 and FIG. 3. Therefore, the operations, features, and technical effects that can be achieved with respect to the method for mining an entity focus in a text are also applicable to the apparatus 500 and the units included therein, and detailed description thereof will be omitted.

Figure 6:
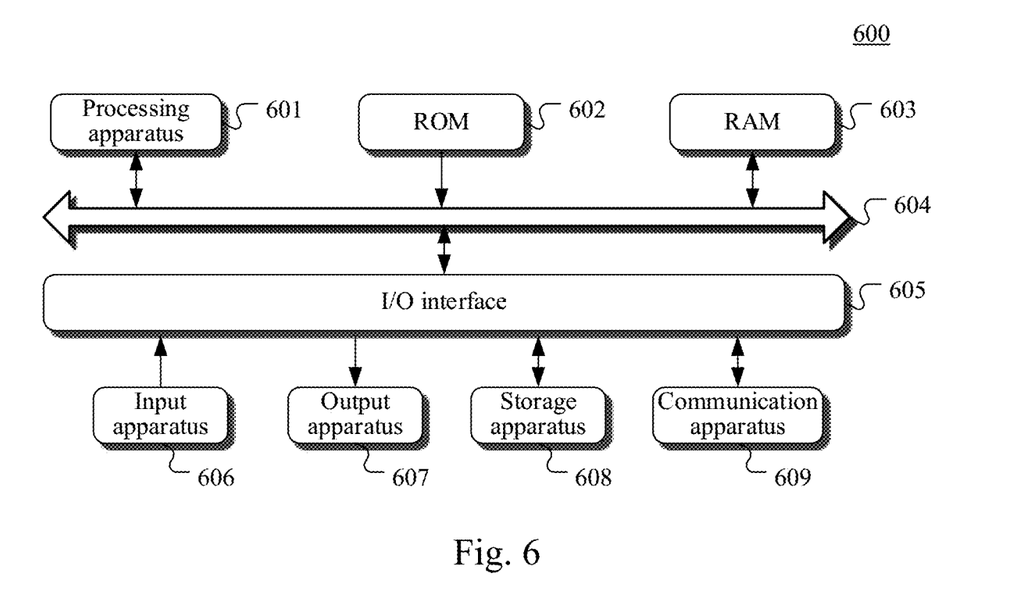
FIG. 6 is a schematic structural diagram of a computer system adapted to implement an electronic device according to embodiments of the present disclosure.

With further reference to FIG. 6, a schematic structural diagram of an electronic device (for example, the server shown in FIG. 1) 600 adapted to implement embodiments of the present disclosure is shown. The electronic device shown in FIG. 6 is merely an example, and should not impose any limitation on the function and scope of use of embodiments of the present disclosure.

As shown in FIG. 6, the electronic device 600 may include a processing apparatus (for example, a central processor, a graphics processor, etc.) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606, including such as a touch screen, a touch pad, a keyboard, a mouse, a camera, a microphone, an accelerometer, or a gyroscope; an output apparatus 607 including such as a liquid crystal display (LCD), a speaker, or a vibrator; the storage apparatus 608 including such as a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the apparatuses shown. More or fewer apparatuses may be implemented or provided instead. Each block shown in FIG. 6 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is embedded in a computer readable medium. The computer program includes program codes for performing the method as illustrated in the flow chart. In such an embodiment, the computer program may be downloaded and installed from a network through the communication apparatus 609, or installed from the storage apparatus 608, or installed from the ROM 602. The computer program, when executed by the processing apparatus 601, implements the above mentioned functionalities as defined by the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: perform word and phrase feature extraction on an input text; input an extracted word and phrase feature into a text coding network for coding, to obtain a coding sequence of the input text; process the coding sequence of the input text using a core entity labeling network to predict a position of a core entity in the input text; extract a subsequence corresponding to the core entity in the input text from the coding sequence of the input text, based on the position of the core entity in the input text; and predict a position of a focus corresponding to the core entity in the input text using a focus labeling network, based on the coding sequence of the input text and the subsequence corresponding to the core entity in the input text.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor, for example, may be described as: a processor including a first extraction unit, a coding unit, a first labeling unit, a second extraction unit and a second labeling unit. Here, the names of these units do not in some cases constitute limitations to such units themselves. For example, the first extraction unit may also be described as "a unit configured to perform word and phrase feature extraction on an input text."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for mining an entity focus in a text, the method comprising:

performing word and phrase feature extraction on an input text, wherein the input text comprises a plurality of entities comprising a core entity representing a subject of the input text;

inputting an extracted word and phrase feature into a text coding network for coding, to obtain a coding sequence of the input text;

predicting a position of the core entity in the input text by processing the coding sequence of the input text using a core entity labeling network, the position of the core entity being a position where the core entity is located in the input text, wherein predicting the position of the core entity in the input text by processing the coding sequence of the input text using a core entity labeling network, comprises:

inputting the coding sequence of the input text into the core entity labeling network to predict a probability of each word string in the input text being the core entity, and labeling a starting position and an ending position of the core entity respectively using a double pointer based on the probability of each word string in the input text being the core entity, wherein the starting position is a position where a first word of the core entity is located in the input text, and the ending position is a position where a last word of the core entity is located in the input text;

extracting a subsequence corresponding to the core entity in the input text from the coding sequence of the input text, based on the position of the core entity in the input text; and predicting a position of a focus corresponding to the core entity in the input text using a focus labeling network, based on the coding sequence of the input text and the subsequence corresponding to the core entity in the input text, wherein the focus corresponding to the core entity is a part of the input text describing the core entity, and the position of the focus is a position where the focus is located in the input text.

2. The method according to claim 1, wherein, the performing word and phrase feature extraction on an input text, comprises:

performing word and phrase hybrid embedding on a word sequence corresponding to the input text to obtain a corresponding word feature vector;

performing position embedding on characters in the word sequence corresponding to the input text to obtain a corresponding position feature vector;

performing named entity recognition on the input text, and generating a named entity type feature vector representing a type of a named entity based on a result of the named entity recognition; and splicing the word feature vector, the position feature vector and the named entity type feature vector corresponding to the input text to form a word and phrase feature vector of the input text.

3. The method according to claim 2, wherein, the generating a named entity type feature vector representing a type of a named entity based on a result of the named entity recognition, comprises:

performing part of speech labeling on a target phrase, in response to not recognizing a type of a named entity of the target phrase in the input text, and generating the named entity type feature vector based on the type of the named entity recognized from the input text and a part of speech labeling result of the target phrase.

4. The method according to claim 1, wherein, the predicting a position of a focus corresponding to the core entity in the input text using a focus labeling network, based on the coding sequence of the input text and the subsequence corresponding to the core entity in the input text, comprises:

acquiring a priori feature of the focus of the core entity constructed based on a focus repository of the core entity; and generating a first focus feature of the input text, based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

5. The method according to claim 4, wherein, the inputting the first focus feature of the input text into the focus labeling network, to predict the position of the focus corresponding to the core entity predicted by the core entity labeling network, comprises:

inputting the first focus feature of the input text into the focus labeling network to predict a probability of each word string in the input text being the focus of the core entity, and labeling a starting position and an ending position of the focus of the core entity respectively using a double pointer based on the probability of each word string in the input text being the focus of the core entity, wherein the starting position is a position where a first word of the focus is located in the input text, and the ending position is a position where a last word of the focus is located in the input text.

6. The method according to claim 1, wherein, the input text comprises: labeling information of the core entity and the corresponding focus; and wherein the method further comprises:

determining prediction errors of positions of the core entity and the corresponding focus in the input text, based on the labeling information of the core entity and the corresponding focus in the input text, and iteratively adjusting parameters in a model for labeling the focus of the core entity using a backpropagation method to obtain a trained model for labeling the focus of the core entity, the model for labeling the focus of the core entity comprising the text coding network, the core entity labeling network, and the focus labeling network.

7. The method according to claim 6, wherein the method further comprises:

extracting a relative position feature of the core entity and the corresponding focus based on the labeling information of the core entity and the corresponding focus in the input text and coding the relative position feature to obtain a relative position feature sequence; and the predicting a position of a focus corresponding to the core entity in the input text using a focus labeling network, based on the coding sequence of the input text and the subsequence corresponding to the core entity in the input text, comprises:

acquiring a priori feature of the focus of the core entity constructed based on a focus repository of the core entity;

splicing a result of coding the subsequence corresponding to the core entity in the input text with the relative position feature sequence to obtain a coding sequence of the core entity in the input text; and generating a second focus feature of the input text, based on the coding sequence of the input text, the priori feature of the focus of the core entity, and the coding sequence corresponding to the core entity in the input text, and inputting the second focus feature of the input text into the focus labeling network, to predict the position of the focus corresponding to the core entity predicted by the core entity labeling network.

8. The method according to claim 1, wherein performing the word and phrase feature extraction on the input text comprises:
performing a word embedding on each of words of a phrase of the input text to obtain a word embedding vector of each word;
performing a phrase embedding on the phrase to obtain a phrase embedding vector of the phrase; and
obtaining a word vector sequence by mixing the word embedding vector of each word with the phrase embedding vector of the phrase comprising each word.

9. An electronic device, comprising:
one or more processors; and
a storage configured to store one or more programs,
wherein the one or more programs, when executed by the one or more processors, cause the one or more processors to perform operations, the operations comprising:
performing word and phrase feature extraction on an input text, wherein the input text comprises a plurality of entities comprising a core entity representing a subject of the input text;
inputting an extracted word and phrase feature into a text coding network for coding, to obtain a coding sequence of the input text;
predicting a position of the core entity in the input text by processing the coding sequence of the input text using a core entity labeling network, the position of the core entity being a position where the core entity is located in the input text, wherein predicting the position of the core entity in the input text by processing the coding sequence of the input text using a core entity labeling network, comprises:
inputting the coding sequence of the input text into the core entity labeling network to predict a probability of each word string in the input text being the core entity, and labeling a starting position and an ending position of the core entity respectively using a double pointer based on the probability of each word string in the input text being the core entity, wherein the starting position is a position where a first word of the core entity is located in the input text, and the ending position is a position where a last word of the core entity is located in the input text;
extracting a subsequence corresponding to the core entity in the input text from the coding sequence of the input text, based on the position of the core entity in the input text; and
predicting a position of a focus corresponding to the core entity in the input text using a focus labeling network, based on the coding sequence of the input text and the subsequence corresponding to the core entity in the input text, wherein the focus corresponding to the core entity is a part of the input text describing the core entity, and the position of the focus is a position where the focus is located in the input text.

10. The electronic device according to claim 9, wherein, the performing word and phrase feature extraction on an input text, comprises:
performing word and phrase hybrid embedding on a word sequence corresponding to the input text to obtain a corresponding word feature vector;
performing position embedding on characters in the word sequence corresponding to the input text to obtain a corresponding position feature vector;
performing named entity recognition on the input text, and generating a named entity type feature vector representing a type of a named entity based on a result of the named entity recognition; and
splicing the word feature vector, the position feature vector and the named entity type feature vector corresponding to the input text to form a word and phrase feature vector of the input text.

11. The electronic device according to claim 10, wherein, the generating a named entity type feature vector representing a type of a named entity based on a result of the named entity recognition, comprises:
performing part of speech labeling on a target phrase, in response to not recognizing a type of a named entity of the target phrase in the input text, and generating the named entity type feature vector based on the type of the named entity recognized from the input text and a part of speech labeling result of the target phrase.

12. The electronic device according to claim 9, wherein, the predicting a position of a focus corresponding to the core entity in the input text using a focus labeling network, based on the coding sequence of the input text and the subsequence corresponding to the core entity in the input text, comprises:
acquiring a priori feature of the focus of the core entity constructed based on a focus repository of the core entity; and
generating a first focus feature of the input text, based on the coding sequence of the input text, the priori feature of the focus of the core entity, and the subsequence corresponding to the core entity in the input text, and inputting the first focus feature of the input text into the focus labeling network, to predict the position of the focus corresponding to the core entity predicted by the core entity labeling network.

13. The electronic device according to claim 12, wherein, the inputting the first focus feature of the input text into the focus labeling network, to predict the position of the focus corresponding to the core entity predicted by the core entity labeling network, comprises:
inputting the first focus feature of the input text into the focus labeling network to predict a probability of each word string in the input text being the focus of the core entity, and labeling a starting position and an ending position of the focus of the core entity respectively using a double pointer based on the probability of each word string in the input text being the focus of the core entity, wherein the starting position is a position where a first word of the focus is located in the input text, and the ending position is a position where a last word of the focus is located in the input text.

14. The electronic device according to claim 9, wherein, the input text comprises: labeling information of the core entity and the corresponding focus; and
wherein the operations further comprise:
determining prediction errors of positions of the core entity and the corresponding focus in the input text, based on the labeling information of the core entity and the corresponding focus in the input text, and iteratively adjusting parameters in a model for labeling the focus of the core entity using a backpropagation method to obtain a trained model for labeling the focus of the core entity, the model for labeling the focus of the core entity comprising the text coding network, the core entity labeling network, and the focus labeling network.

15. The electronic device according to claim 14, wherein the operations further comprise:
    extracting a relative position feature of the core entity and the corresponding focus based on the labeling information of the core entity and the corresponding focus in the input text and coding the relative position feature to obtain a relative position feature sequence; and
    the predicting a position of a focus corresponding to the core entity in the input text using a focus labeling network, based on the coding sequence of the input text and the subsequence corresponding to the core entity in the input text, comprises:
    acquiring a priori feature of the focus of the core entity constructed based on a focus repository of the core entity;
    splicing a result of coding the subsequence corresponding to the core entity in the input text with the relative position feature sequence to obtain a coding sequence of the core entity in the input text; and
    generating a second focus feature of the input text, based on the coding sequence of the input text, the priori feature of the focus of the core entity, and the coding sequence corresponding to the core entity in the input text, and inputting the second focus feature of the input text into the focus labeling network, to predict the position of the focus corresponding to the core entity predicted by the core entity labeling network.

16. A non-transitory computer readable medium, storing a computer program thereon, wherein the program, when executed by a processor, causes the processor to perform operations, the operations comprising:
    performing word and phrase feature extraction on an input text, wherein the input text comprises a plurality of entities comprising a core entity representing a subject of the input text;
    inputting an extracted word and phrase feature into a text coding network for coding, to obtain a coding sequence of the input text;
    predicting a position of the core entity in the input text by processing the coding sequence of the input text using a core entity labeling network, the position of the core entity being a position where the core entity is located in the input text, wherein predicting the position of the core entity in the input text by processing the coding sequence of the input text using a core entity labeling network, comprises:
        inputting the coding sequence of the input text into the core entity labeling network to predict a probability of each word string in the input text being the core entity, and labeling a starting position and an ending position of the core entity respectively using a double pointer based on the probability of each word string in the input text being the core entity, wherein the starting position is a position where a first word of the core entity is located in the input text, and the ending position is a position where a last word of the core entity is located in the input text;
    extracting a subsequence corresponding to the core entity in the input text from the coding sequence of the input text, based on the position of the core entity in the input text; and
    predicting a position of a focus corresponding to the core entity in the input text using a focus labeling network, based on the coding sequence of the input text and the subsequence corresponding to the core entity in the input text, wherein the focus corresponding to the core entity is a part of the input text describing the core entity, and the position of the focus is a position where the focus is located in the input text.

* * * * *